(12) United States Patent
Cranston

(10) Patent No.: US 10,168,151 B2
(45) Date of Patent: Jan. 1, 2019

(54) GEARBOX ORIENTATION SYSTEM

(71) Applicant: Daniel Cranston, Sanford, NC (US)

(72) Inventor: Daniel Cranston, Sanford, NC (US)

( * ) Notice: Subject to any disclaimer, the term of this patent is extended or adjusted under 35 U.S.C. 154(b) by 262 days.

(21) Appl. No.: 15/162,989

(22) Filed: May 24, 2016

(65) Prior Publication Data

US 2017/0138731 A1 May 18, 2017

Related U.S. Application Data

(60) Provisional application No. 62/255,096, filed on Nov. 13, 2015.

(51) Int. Cl.
*G01C 9/06* (2006.01)
(52) U.S. Cl.
CPC ..................... *G01C 9/06* (2013.01)
(58) Field of Classification Search
CPC ........................................ G01C 9/06
USPC ......................................... 33/333
See application file for complete search history.

(56) References Cited

U.S. PATENT DOCUMENTS

| | | | | |
|---|---|---|---|---|
| 4,777,352 A * | 10/1988 | Moore | ..................... | F41G 3/06 |
| | | | | 235/404 |
| 7,122,986 B1 * | 10/2006 | Willard | .................. | H01H 33/36 |
| | | | | 318/468 |
| 9,696,693 B2 * | 7/2017 | Element | ................. | G05B 11/01 |
| 9,771,239 B2 * | 9/2017 | Tracey | ................ | B65H 75/4484 |
| 2006/0209637 A1 * | 9/2006 | May | .......................... | G04C 9/00 |
| | | | | 368/223 |
| 2014/0163742 A1 * | 6/2014 | Element | .................... | E06B 9/32 |
| | | | | 700/275 |
| 2014/0290870 A1 * | 10/2014 | Colson | ..................... | E06B 9/42 |
| | | | | 160/10 |
| 2017/0138731 A1 * | 5/2017 | Cranston | .................. | G01C 9/06 |

* cited by examiner

*Primary Examiner* — Yaritza Guadalupe
(74) *Attorney, Agent, or Firm* — Forrest Firm

(57) ABSTRACT

A gearbox orientation system for indicating the orientation of a gearbox is provided. The orientation system includes at least one sensor for measuring sensed data of a gearbox, such as the relative orientation of the gearbox and its absolute orientation. The system may further include at least one microcontroller in communication with the at least one sensor for determining indicator data using the sensed data. Additionally, the system may further include at least one indicator in communication with the at least one microcontroller for displaying indicator data using the sensed data.

17 Claims, 6 Drawing Sheets

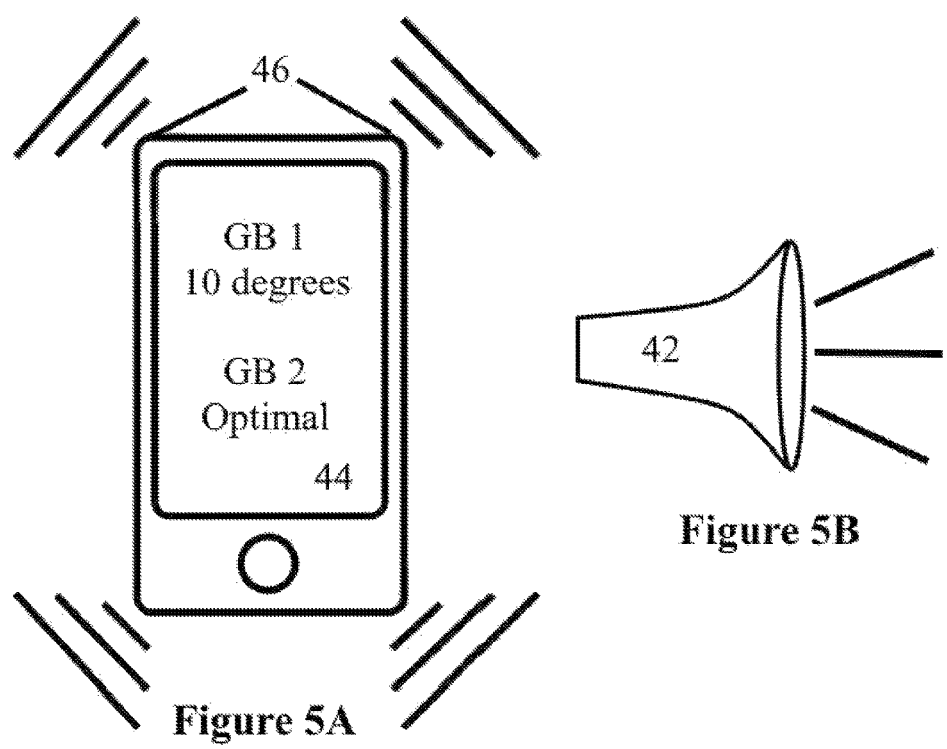
Figure 5A
Figure 5B
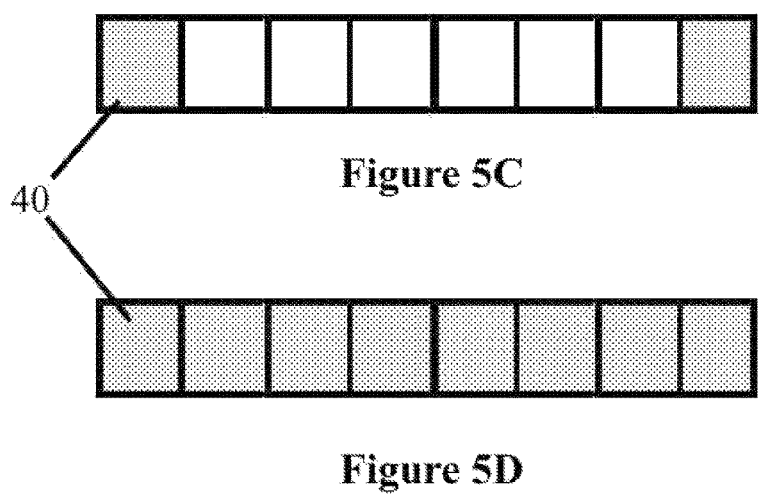
Figure 5C
Figure 5D

GEARBOX ORIENTATION SYSTEM

CROSS REFERENCE TO RELATED APPLICATIONS

This application claims the benefit of U.S. Provisional Application No. 62/255,096, filed Nov. 13, 2015, which is herein incorporated by reference in its entirety.

TECHNICAL FIELD

The presently disclosed subject matter is directed towards a gearbox orientation sensor and indicator. Specifically, the gear box orientation sensor may be a mobile sensor or integrated within the gear box itself.

BACKGROUND

Checking and filling the oil in a rotating gearbox, such as those typically used in large vehicles and machinery, is a maintenance operation that is routinely performed. In order to effectively gauge the oil level, or to properly access the interior of the gearbox, the gearbox must be appropriately orientated. Many gearboxes includes a fill line or orientation symbols on the exterior housing of a gearbox to indicate to an operator when the gear box is properly orientated. Typically, the proper orientation is achieved by operating the vehicle or machinery is such a manner as to rotate the gearbox into the proper position, where the gearbox is appropriately orientated.

Operation of many vehicles and machinery does not afford the operator a clear line of sight to the gear box. Therefore, in order to determine whether the gear box is appropriately oriented, the operator must cease operating the machinery to repeatedly check the gearbox orientation or the operator must employ the assistance of another person to relay the orientation of the gearbox to the operator during orientation.

Accordingly, there remains a need for a device and method that addresses the various disadvantages associated with previous gearbox systems and methods of use.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Further, the claimed subject matter is not limited to implementations that solve any or all disadvantages noted in any part of this disclosure.

According to at least one embodiment of the disclosed subject matter, a gearbox orientation system is provided. The system includes at least one sensor for measuring sensed data of a gearbox an at least one microcontroller in communication with the at least one sensor for determining indicator data using the sensed data.

According to at least another embodiment of the disclosed subject matter, a gearbox orientation system is provided including at least one sensor for measuring sensed data and at least one indicator in communication with the at least one sensor for displaying indicator data using the sensed data.

According to at least one embodiment of the disclosed subject matter, a method of operating a gearbox orientation system is provided. The method includes at least one sensor measuring sensed data and at least one microcontroller communicating with the at least one sensor and determining indicator data using the sensed data.

According to at least one embodiment of the disclosed subject matter, a method of operating a gearbox orientation system is provided. The method includes at least one sensor measuring sensed data and at least one indicator communicating with the at least one sensor and displaying indicator data determined using the sensed data.

BRIEF DESCRIPTION OF THE DRAWINGS

The foregoing, as well as the following Detailed Description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed.

FIG. 5A is a view of a mobile communication device having a digital display and motion source according to one or more embodiments of the presently disclosed subject matter.

FIG. 5B is a view of a sound source according to one or more embodiments of the presently disclosed subject matter.

FIGS. 5C and 5D are views of a light source according to one or more embodiments of the presently disclosed subject matter.

DETAILED DESCRIPTION

Figure 1:
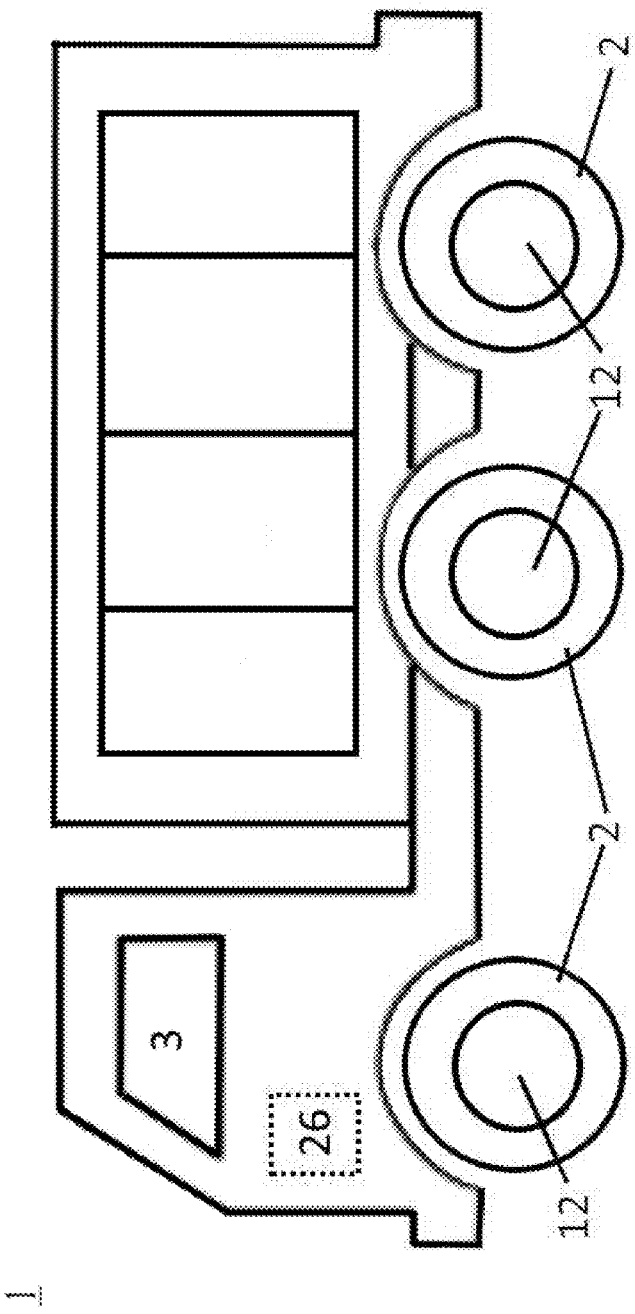
FIG. 1 is a side view of a vehicle having gearboxes and a power source according to one or more embodiments of the presently disclosed subject matter.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

FIG. 1 is a side view of a vehicle 1 having gearboxes 12 and a power source 26 according to one or more embodiments of the presently disclosed subject matter. The gearboxes are positioned within the tires 2 of the vehicle 1. Further, the operator is typically positioned within the operator area 3 when operating the vehicle 1 and/or rotating the various gearboxes 12.

The gearbox orientation system 10 of the present invention may include at least one sensor 14 and at least one indicator 16 in communication with the at least one sensor 14 for indicating whether the gearbox is appropriately oriented. The gearbox orientation system 10 may further include at least one microcontroller 18 for performing calculations upon the sensed data 50 to create indicator data 52 for communication to the indicator 16 from the at least one sensor 14.

The at least one sensor 14 of the gearbox orientation system 10 may include a gyroscope 32 for determining the angular velocity of a gearbox 12 in at least one relative axis. The gyroscope 32 may be a single-axis, dual-axis or triple-axis gyroscope. As the gearbox 12 rotates, the gyroscope 32 fixed thereon may sense the angular rotation of the gearbox 12 to created sensed data 50. This sensed data 50 may be used by a microcontroller 18 to determine how quickly the gearbox 12 is rotating and when the gearbox 12 is approaching the desired orientation or will be within a desired orientation range.

Additionally, the at least one sensor 14 of the system 10 may include a magnetometer 34 for determining the absolute orientation of the gearbox 12 or the vehicle or machine in at least one absolute axis. In the embodiment of FIG. 6C, the sensor housing 30 may include both a gyroscope 32 and a magnetometer 34, as well as the microcontroller 18. The magnetometer 34 may be a single-axis, dual-axis or triple-axis magnetometer for measuring the absolute orientation of the gearbox 12 in the x, y and/or z-axis relative to Earth's surface. As the gearbox 12 rotates, and as the vehicle or machine traverses, the magnetometer 34 may sense the absolute orientation of the gearbox 12 or the vehicle or machine to create sensed data 50. This sensed data 50 may be used by a microcontroller 18 to determine the orientation of the gearbox 12 relative to Earth's surface. When used in conjunction with the sensed data 50 of the gyroscope 32, the microcontroller 18 may produce indicator data 52 for operation of the indicator(s) 16.

Figure 6A:
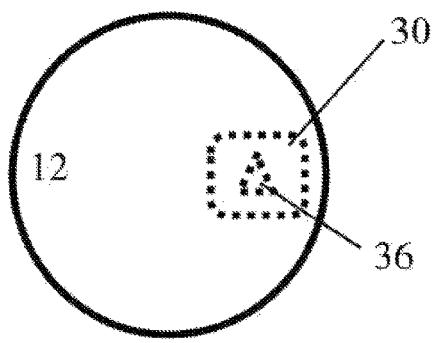
FIG. 6A is a view of a gearbox having a sensor housing embedded therein according to one or more embodiments of the presently disclosed subject matter.
Figure 6B:
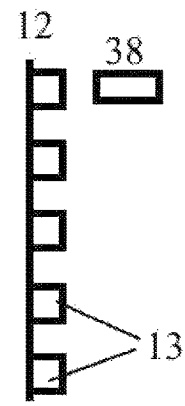
FIG. 6B is a view of a gearbox with teeth being detected by a detector sensor according to one or more embodiments of the presently disclosed subject matter.
Figure 6C:
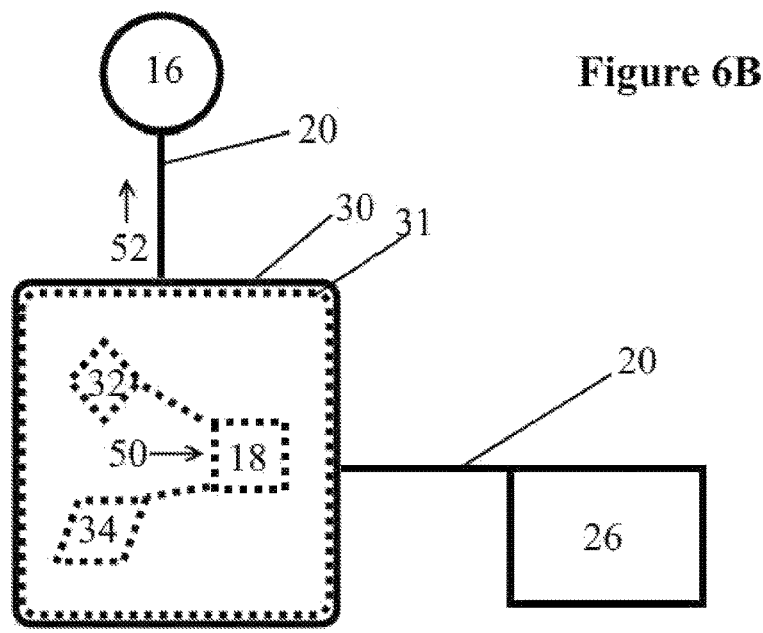
FIG. 6C is a view of a sensor housing in wired connection with a power source and indicator according to one or more embodiments of the presently disclosed subject matter.

In other embodiments, the at least one sensor 14 may include an accelerometer 36 for measuring changes in gravitational acceleration of the gearbox 12 and creating sensed data 50 (e.g., see FIG. 6A). Alternatively, at least one sensor 14 may be a detector 38 positioned proximal to the gearbox 12 for measuring the rotation and/or relative orientation of the gearbox 12. For example, but not limited thereto, a sensor 14 may be positioned proximal to teeth of the gearbox 12 (e.g., bolt heads) for measuring the change in distance from the gearbox 12 and teeth, permitting calculation by the microcontroller 18 of each passing tooth for determining the rotational speed and orientation of the gearbox 12 (e.g., see FIG. 6B). In one embodiment, at least one particular tooth or surface feature of the gearbox outer surface may be detectable by the detector 38 for determining when the gearbox 12 is in the desired orientation or approaching a desired orientation range.

In yet another embodiment, the at least one sensor 14 may include a tilt sensor or tilt switch 37 for creating sensed data 50 for determining when the gearbox 12 is in the desired orientation or approaching a desired orientation range. This sensed data 50 may be processed by the microcontroller 18 for making such determinations.

In some embodiments, the gearbox orientation system 10 includes a sensor housing 30 for housing at least one of the sensors 14 and/or the microcontroller 18. The sensor housing 30 may be permanently affixed to the outer surface of the gearbox 12, the interior of the gearbox 12, or proximal to the gearbox 12. In some embodiments, the gearbox itself may serve as the sensor housing. Alternatively, the sensor housing 30 may be a mobile unit, selectively engageable with the gearbox 12 or a component of the vehicle or machine proximal to the gearbox 12. In yet another embodiment, portions of the gearbox 12 itself may form the sensor housing (e.g., see FIG. 3). The sensor housing 30 may include a housing engagement 31 for engaging the gearbox 12, vehicle or machinery. For example, but not limited thereto, the housing engagement 31 may include a metal plate affixed to a magnet for permitting the selective engagement of the housing 30 to the gearbox 12.

Figure 3:
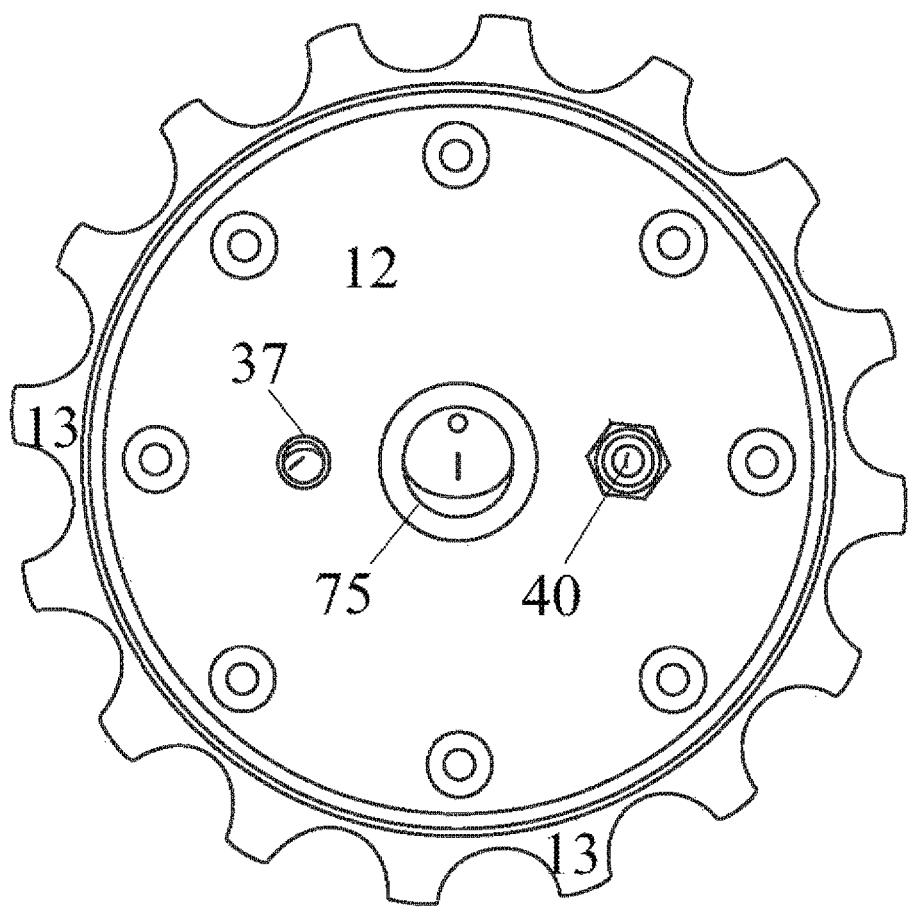
FIG. 3 is a top view of a gearbox having sensors embedded thereon according to one or more embodiments of the presently disclosed subject matter.

Referring to FIG. 3, the gearbox 12 may include a sensor power switch 75 for powering on and off one or more sensors 14 of the gearbox 12. In the various embodiments of the gearbox 12 described herein, the gearbox 12 may be manufactured to include the disclosed features, may be retrofitted to includes the disclosed features, or the disclosed features may be coupled to, or selectively engaged with, the gearbox 12. The gearbox 12 may further include a tilt sensor or tilt switch 37 for creating sensed data 50 for determining when the gearbox 12 is in the desired orientation or approaching a desired orientation range. Additionally, the gearbox may include one or more light sources 40 for indicating whether the one or more sensors 14 is operating properly, is powered on or off, and/or is creating sensed data within a particular range (e.g., indicating the orientation of the gearbox).

Generally, the at least one microcontroller 18 may be used to perform any number of calculations upon the sensed data 50 to create indicator data 52. The microcontroller 18 of one embodiment may combine the sensed data 50 of a gyroscope 32 and magnetometer 34 to determine the absolute orientation of the gearbox 12 and how it is changing with time, which an operator, through the indicators 16, may use to determine when the operator should stop the rotation of the gearbox 12. In some embodiments, each gearbox 12 may have a microcontroller 18 associated therewith for calculating indicator data 52 for the respective gearbox 12.

Figure 4:
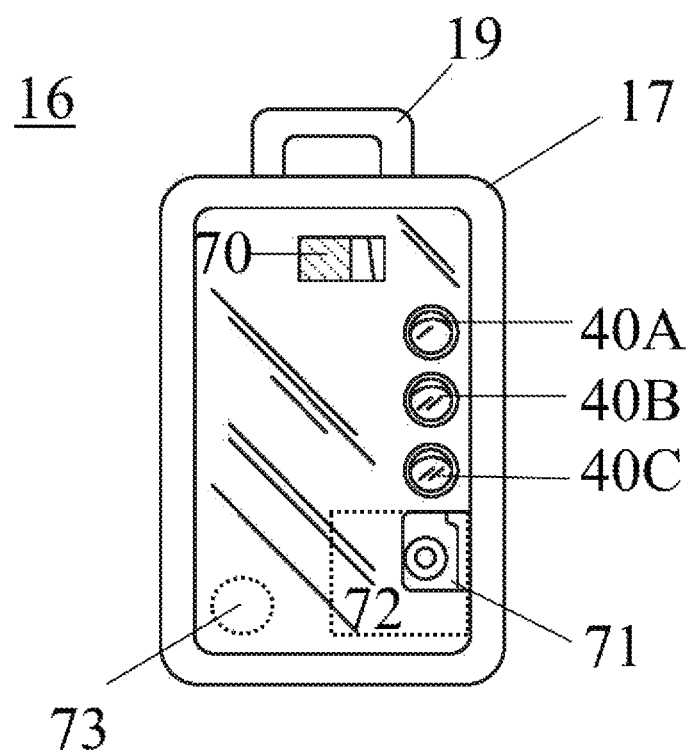
FIG. 4 is a top view of an indicator having a housing and sources according to one or more embodiments of the presently disclosed subject matter.

The indicator 16 of the gearbox orientation system 10 may include at least one source or display 40, 42, 44, 46 and an indicator power switch 70. For example, in FIG. 4, the indicator 16 may include: a light source 40A for indicating whether the power switch 70 is in an on or off position, a light source 40B for indicating whether a first gearbox is in a specific range and/or position, and a light source 40C for indicating whether a second gearbox is in a specific range and/or position. Alternatively, sources 40B and 40C may additionally indicate whether a gearbox sensor 14 is operating correctly (e.g., a red color may indicate improper function, no color may indicate proper function—not level, and white may indicate proper function—level).

The indicator may further include an indicator housing 17 having a loop 19 for securing or coupling the indicator 16 to another object or into a particular position. Further, the indicator 16 may include an external port 71 for charging and/or recharging a rechargeable power source 72 therein (e.g., rechargeable lithium battery). Alternatively, the power source 72 may be non-rechargeable or wired to a power source of the vehicle. An internal port 73 may also be included in the indicator 16 for communicating software updates to the indicator 16 and/or for pairing the indicator 16 with any other components of the gearbox orientation system 10 (e.g., gearboxes 12). In some embodiments, the external port 71, internal port 73 and rechargeable power source 72 may similarly be deployed with one or more gearboxes 12 or sensor housings 30 for providing power and non-wireless communications.

Alternatively, the indicator 16 of the gearbox orientation system 10 may include at least one of the following: a light source 40, a sound source 42, a digital display 44 and a motion source 46. FIGS. 5A-5D depict several embodiments of the indicator 16. The indicator(s) 16 may receive indicator data 52 from at least one microcontroller 18 for displaying indications to an operator of a vehicle or machine so that the operator may determine when the gearbox 12 is orientated in a desired range or optimal orientation or when the gearbox 12 is approaching the desired range or optimal orientation. The indicator 16 may indicate whether the gearbox 12 is appropriately orientated (or approaching orientation) in an x, y or z axis, each axis being perpendicular to each other. In some embodiments, at least one of the indicators 16 may be housed within the sensor housing 30. For example, but not limited thereto, a sound source 42 may be housed within the housing 30 for emitting a loud noise for indication to the operator. The range of orientation may be, for example and not limited thereto, +/−3 degrees from an optimal position, where the optimal position may include a variance of about +/−1 degree. In some embodiments, each gearbox 12 may have a specific range and/or position.

In some embodiments, at least one light source 40 is provided. The light source 40 may be light emitting diodes or some other light-emitting source. One embodiment provides multiple light sources 40 positioned in a linear fashion proximal to each other. The outermost lights sources 40 may emit light as the gearbox 12 approaches the appropriate orientation, and as the gearbox 12 rotates closer to the desired orientation additional light sources 40 positioned inside of the outermost sources 14 additionally emit light, until the gearbox 12 is in a most optimal position, at which point all of the light sources 14 are emitting light. Using this method, the light sources 40 indicate to the operator, in a progressive manner, the gearbox orientation as it enters the desired range, reaches an optimal orientation, and exits the desired range.

In other embodiments, at least one light source 40 may indicate the orientation of the gearbox 12 in a first axis, and at least one other light source 40 may indicate the orientation of the gearbox 12 in a second axis. The method of using such an embodiment may allow the operator to maneuver the vehicle or machine in the appropriate direction (e.g., along the x or y axis) to efficiently orientate the gearbox 12. Each axis may be indicated using a single light source 40 or multiple light sources 40.

In yet another embodiment including light sources 40, the relative strength of the gearbox's orientation may be indicated. For example, but not limited thereto, the light sources 40 may indicate that the orientation is acceptable ], then, as the gearbox 12 rotates closer to an optimal orientation, the light source 40 may indicate the orientation is good ]], better ]]] and then best ]]]]. As the gearbox 12 rotates beyond the optimal orientation, the light sources 40, may indicate the orientation is better ]]], good ]], acceptable ], and finally unacceptable. As with each of the indicator 16 configurations including more than one source 40, 42, 46, the varying indications enable the operator to have advance notice as the gearbox's orientation approaches an optimal orientation.

The indicator 16 may also include at least one sound source 42 for indicating to the operator the orientation of the gearbox 12. The at least one sound source 42 may indicate entrance or approach of the orientation into a desired range using a single beep, and as the orientation of the gearbox 12 approaches the optimal orientation, multiple beeps, with a decreasing delay between them may be provided, until the beeps converge into a single, sustained sound indication at the optimal orientation. As the gearbox 12 rotates away from the optimal orientation, the at least one sound source 42 may indicate such to the operator by diverging the sustained sound into beeps with an increased delay between the beeps.

A sound source 42, as with all indicators 16, may be used in conjunction with a light source 40, motion source 46 or digital display 44. Further, as with all indicators 16, they may be positioned anywhere on the vehicle or machine, or even exterior to the vehicle or machine, such as on the wall of a building or structure. In some embodiments, at least one of the indicators 16 is positioned within the operator's operational space, such as on top of an operator dashboard.

The gearbox orientation system 10 may include a motion source 46 for providing motion indications to an operator. Alternatively, the system may include a digital display 44 as the indicator 16 for providing indications via a graphic user interface, for example. The display 44 may be a mobile phone, with the mobile phone able to serve as both a display 44 or a motion source 46 or both. In such an embodiment, the mobile phone may be operable to receive wireless communication from at least one microcontroller 18, or directly from the sensor(s) 14 themselves, as the mobile phone may have the computational ability to process the sensed data 50 to produce indicator data 52. An application or software may be operating on the mobile phone to permit these calculations.

In at least one embodiment of the present invention, the system 10 includes at least one indicator 16 for each gearbox 12 of the machine or vehicle. Additionally, the system 10 may also include an indicator 16 for measuring an absolute axis in addition to the individual indicators for measuring a relative axis of each rotating gearbox. For example but not limited thereto, the indicator 16 for measuring the absolute axis may be positioned substantially in the center of the vehicle, such as the front or rear exterior of the vehicle or machine.

Further, the gearbox orientation system 10 may include a power source 26 for powering the components of the system 10. The power source 26 could be a power source of the vehicle or machine in which the system 10 operating. For example, but not limited thereto, the power source could be a battery of a vehicle. Alternatively, the power source 26 could be an independent source of the system 10 itself. For example, but not limited thereto, the sensor housing 30 could include a battery or a device which captures the rotational energy of the gearbox 12 or rotating magnets of the gearbox 12.

Figure 2:
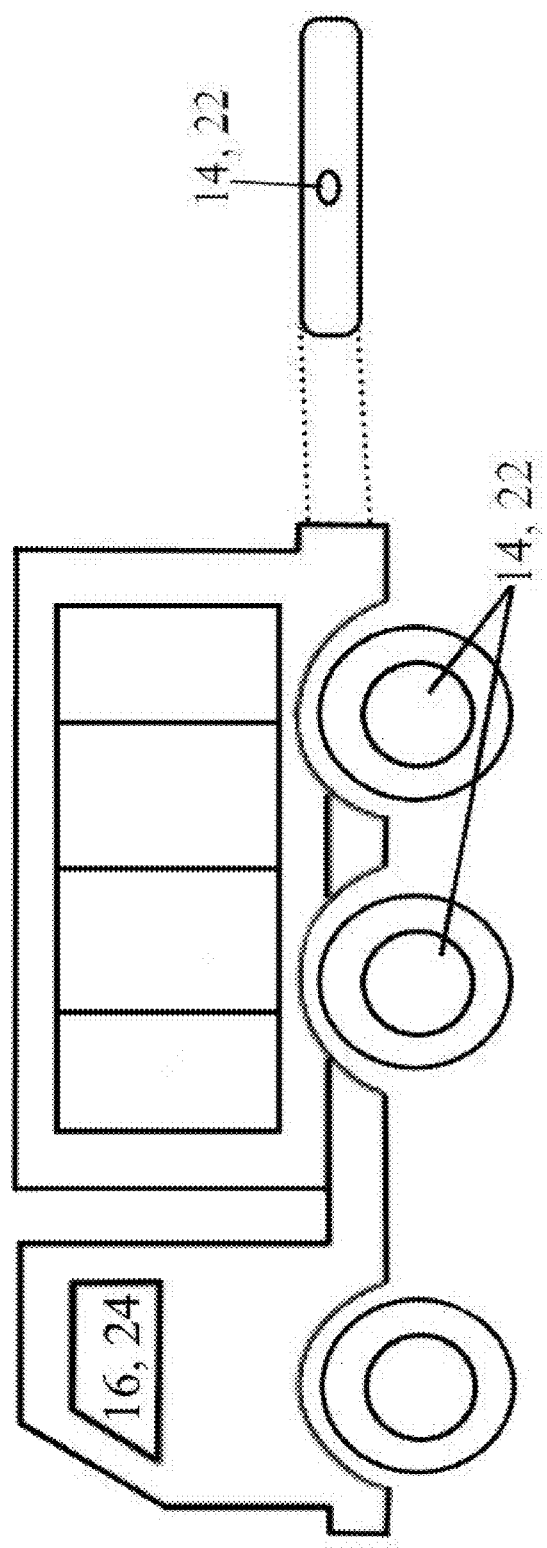
FIG. 2 is a side view of a vehicle having sensors in wireless communication with an indicator according to one or more embodiments of the presently disclosed subject matter.

Communication between various components of the gearbox orientation system 10 may be performed using a number of different mediums or devices. A wire 20 may connect sensors 14 to the microcontroller 18 and the microcontroller 18 to the indicator(s) 16. Alternatively, each of these components may communicate wirelessly using a wireless transmitter 22 and wireless receiver 24. For example, but not limited thereto, the microcontroller 18 may include a wireless transmitter for transmission of the indicator data 52 to a wireless receiver 24 in communication with at least one indicator 16 or another microcontroller 18 in communication with the at least one indicator 16 (e.g., see FIG. 2). Bluetooth communication may be used, particularly when a mobile device, such as a phone, is used as a microcontroller 18 or indicator 16.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

The invention claimed is:

1. A gearbox orientation system comprising:
    at least one sensor for measuring sensed data of a gearbox;
    at least one microcontroller in communication with the at least one sensor for determining indicator data using the sensed data;
    at least one indicator in communication with the at least one microcontroller for providing indications using the indicator data; and
    at least one housing including an indicator and an internal port for pairing a wireless transmitter and a wireless receiver,
        wherein the wireless transmitter is in communication with the at least one microcontroller for transmitting the indicator data, and
        wherein the wireless receiver is in communication with the at least one indicator for receiving the indicator data.

2. The gearbox orientation system of claim 1, further including a gearbox for housing the at least one sensor and the at least one microcontroller.

3. The gearbox orientation system of claim 1, wherein the at least one sensor includes a tilt sensor or gyroscope for measuring the orientation of the gearbox.

4. The gearbox orientation system of claim 1, further comprising at least one source positioned on the gearbox for indicating when the gearbox is properly orientated.

5. The gearbox orientation system of claim 1, further including a power switch for activating the at least one sensor.

6. The gearbox orientation system of claim 1, further including a gearbox power source for providing power to the at least one sensor and the at least one microcontroller.

7. The gearbox orientation system of claim 6, wherein the gearbox power source is a rechargeable battery housed within the gearbox.

8. The gearbox orientation system of claim 1, wherein the housing further includes at least one source for indicating when the gearbox is properly orientated.

9. The gearbox orientation system of claim 1, wherein the housing further includes a power switch and a power source.

10. The gearbox orientation system of claim 9, further including an external port for charging the power source.

11. The gearbox orientation system of claim 1, wherein the housing further includes a power switch and a wire extending from the housing for connecting to a power source.

12. The gearbox orientation system of claim 1, wherein the housing is a smartphone.

13. A gearbox orientation system comprising:
    a gearbox including:
        at least one tilt sensor for measuring the orientation of the gearbox;
        a wireless transmitter for transmitting the orientation of the gearbox;
        a gearbox power source for powering the at least one tilt sensor and the wireless transmitter when activated by a gearbox power switch on the gearbox;
        at least one source positioned on the gearbox for indicating the orientation;
    an indicator housing including:
        a wireless receiver for receiving the orientation;
        at least one indicator for indicating the orientation;
        an indicator power source for powering the at least one indicator and the wireless receiver when activated by an indicator power switch on the indicator.

14. The gearbox orientation system of claim 13, wherein the indicator power source is a rechargeable battery and the indicator housing including an external port for charging the battery.

15. The gearbox orientation system of claim 13, wherein the indicator housing is a smartphone.

16. A gearbox orientation system comprising:
    components for retrofitting a gearbox including:
        at least one tilt sensor for measuring the orientation of the gearbox;
        a wireless transmitter for transmitting the orientation of the gearbox;
        a gearbox power source for powering the at least one tilt sensor and the wireless transmitter when activated by a gearbox power switch on the gearbox;
        at least one source positioned on the gearbox for indicating the orientation;
    an indicator housing including:
        a wireless receiver for receiving the orientation;
        at least one indicator for indicating the orientation.

17. The gearbox orientation system of claim 16, wherein the indicator housing is a smartphone.

* * * * *